3,084,093
INTERNAL SIZING OF PAPER
Charles G. Humiston, Midland, Mich., assignor to The Dow Chemical Company, Midland, Mich., a corporation of Delaware
No Drawing. Filed Feb. 6, 1961, Ser. No. 87,086
4 Claims. (Cl. 162—168)

This invention is directed to a method for increasing the water resistance of paper and to the resulting paper product.

In the manufacture of paper, particularly when the latter is designed for subsequent use with water-based inks, it is a common practice to incorporate an internal sizing agent such as rosin or wax in the paper stock prior to the formation of sheets therefrom. Such internal sizing agents serve to increase the water resistance of the finished paper. In such practice, however, the dispersion of the rosin or wax must be carefully controlled and the use of auxiliary agents such as alum is necessary to obtain the proper deposition of the sizing agent on the pulp fibers. The use of alum usually precludes the use of alkaline fillers such as calcium carbonate.

It is an object of the present invention to provide a novel method for increasing the water resistance of paper. Another object is to provide such a method which requires only relatively small amounts of internal sizing agent and which is applicable in the presence of alkaline fillers. It is a further object to provide paper products resistant to water penetration having incorporated therein a polymer of a cyclohexylamino-alkyl acrylate. Other objects will become apparent from the following specification and claims.

In accordance with the present invention it has been discovered that the incorporation of small amounts of polymers of 2(cyclohexylamino) alkyl acrylates or methacrylates or their salts in beaten cellulosic pulp suspensions provides outstanding water resistance in paper prepared from the pulp so treated. It is among the advantages of the invention that this internal sizing effect can be obtained on neutral pulps and without the addition of alum so that alkaline fillers such as calcium carbonate may be employed in the pulp suspension.

The polymers employed in the invention are the poly(cyclohexylamino)alkyl acrylates and poly(cyclohexylamino)alkyl methacrylates obtained by polymerizing the corresponding monomers through the ethylenic double bond. Such polymerization is accomplished in known manner as, for example, by exposing an aqueous solution of a 2(cyclohexylamino)alkyl acrylate or methacrylate or a salt thereof such as the hydrochloride, to the action of ultra-violet light, gamma rays or other ionizing radiation or by heating such a solution with a polymerization catalyst such as benzoyl peroxide, potassium persulfate, hydrogen peroxide, tertiarybutyl hydroperoxide, azobisisobutyronitrile or the like. In such polymers it is preferred that the alkyl groups contain 2 or 3 carbon atoms.

Accordingly the homopolymers of the invention correspond to the formula:

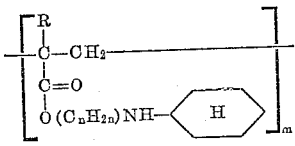

wherein R represents methyl or hydrogen, $n$ is 2 to 4, and $m$ is at least about 50 and preferably at least 100.

In most instances it is preferable to employ homopolymers, as set forth above, although copolymers of two or more of the (cyclohexylamino)alkyl acrylates and methacrylates may be employed if desired. Similarly, it will be apparent that copolymers of one or more of said acrylates and methacrylates with a minor proportion of up to about 10 mole percent of a suitable vinyl monomer such as vinyl acetate, acrylamide, methacrylamide, acrylonitrile, vinyl methyl ether or the like, may be employed. It is generally preferred to employ said polymers or copolymers in the form of their salts with mineral acids such as hydrochloric and sulfuric acids. All such homopolymers and copolymers and mineral acid salts thereof are hereinafter referred to generically as "polymers." The polymers of the invention have moderate high molecular weights of the order of at least 10,000 and preferably in excess of 20,000 provided that such polymers must have an appreciable solubility of at least about one percent by weight in water. In practice it has been found that the mineral acid salt forms of the polymers, such as the hydrochlorides thereof, have excellent water solubility and the polymeric hydrochlorides are preferred polymers for use in accordance with the invention.

In carrying out the invention, the cellulosic pulp is prepared from wood, linen, cotton or other cellulosic material by chemical treatment, macerating, beating and/or refining by conventional methods in the paper pulp art to provide an aqueous slurry of beaten cellulosic fibers. The slurry is then diluted to the proper consistency for the particular sheet-forming process to be employed and an aqueous solution of one of the above-described polymers added thereto. The addition of the polymer solution can be made at any convenient point in the papermaking system provided the polymer is thoroughly mixed with the pulp slurry prior to the formation of paper sheets therefrom. In practice, it is preferred to introduce the polymer solution into the pulp slurry near the end of beating cycle or shortly thereafter although the polymer solution can be added just prior to sheet formation, for example directly in the head-box, provided that adequate mixing is accomplished before the paper sheet is formed. After addition of the polymer the formation of the sheeted product is carried out in conventional fashion.

The exact amount of polymer used may vary depending on the type of pulp employed, the beating schedule and the degree of sizing desired in the finished paper. In general, from about 0.1 to about 1 percent by weight of polymer based on the weight of fiber is admixed with the pulp slurry. Higher amounts of up to about 3 percent of polymer will sometimes be required for special papers or circumstances. Conveniently, the polymer is added to the pulp slurry in the form of a stock solution containing from about 0.25 to about 2 percent by weight of the polymer. Conventional additiments such as fillers can also be added although it is preferred to incorporate the polymer prior to the addition of mineral fillers to the furnish. When mineral fillers are added prior to the addition of the polymer somewhat higher amounts of polymer may be required to achieve the desired sizing effect.

In a representative operation, unbleached hardwood soda pulp was beaten in a laboratory beater to give a beaten pulp of 1.5 percent consistency. 330 milliliters of the beaten pulp (containing 5 grams of fiber) was diluted with 2 liters of water and 2.5 milliliters of an aqueous 1 percent solution of a poly(2-cyclohexylaminoethyl methacrylate) hydrochloride, having a molecular weight of over 10,000 was added thereto with stirring. The resulting treated pulp slurry, containing 0.5 percent by weight of polymer based on the fiber, was dispersed in about 25 liters of water in a modified Williams handsheet mold and a handsheet was formed. The latter was couched and dried for 1 minute at 100° C. in an Elmes hydrolair hot press. Thereafter, the paper handsheet was conditioned in a controlled humidity chamber according to TAPPI standards (TAPPI refers to the Technical Association of the Pulp and Paper Industry).

The conditioned sheet prepared above was tested for efficiency of sizing by determining the rate at which a micro-droplet was absorbed into the paper sheet. A droplet of 0.0006 milliliter of water was placed on the sheet using a micrometer-driven tuberculin syringe with a No. 27 hypodermic needle. The droplet was observed under a 20-power microscope and the time recorded from contact of the droplet with the paper surface to complete absorption into the paper sheet. In replicated tests it was found that from 504 to 649 seconds were required for absorption of the micro-droplet into the paper sized with 0.5 percent by weight of poly(2-cyclohexylaminoethyl methacrylate) hydrochloride. For comparison, in the same test method, absorption times of 500 to 600 seconds were obtained on good quality writing paper sized with about 3 percent rosin fixed with alum.

In a similar fashion good sizing is obtained by incorporating poly(2-cyclohexylaminoethyl acrylate)hydrosulfate, poly(2-cyclohexylaminopropyl acrylate)hydrobromide, poly(3-cyclohexylaminopropyl methacrylate)hydrochloride or poly(2-cyclohexylaminobutyl methacrylate)hydrochloride in paper in the above-described manner.

I claim:

1. A method for sizing paper which comprises incorporating a small amount of a water-soluble polymer, selected from the group consisting of polycyclohexylaminoalkyl acrylates and polycyclohexylaminoalkyl methacrylates and the mineral acid salts thereof wherein the alkyl group contains from 2 to 4 carbon atoms, in an aqueous slurry of cellulosic fiber and forming a paper sheet from the treated slurry.

2. A method according to claim 1 wherein the polymer is employed in the amount of from 0.1 to 1 percent based on the weight of cellulosic fiber.

3. A method according to claim 1 wherein the polymer has a molecular weight of at least about 20,000.

4. A method according to claim 1 wherein the polymer is poly 2-cyclohexylaminoethyl methacrylate hydrochloride.

References Cited in the file of this patent
UNITED STATES PATENTS

| | | |
|---|---|---|
| 2,138,762 | Harmon | Nov. 29, 1938 |
| 2,168,338 | Heckert | Aug. 8, 1939 |
| 2,169,366 | Meigs | Aug. 15, 1939 |
| 2,601,598 | Daniel | June 24, 1952 |
| 2,964,445 | Daniel | Dec. 13, 1960 |